United States Patent
Thomas

(10) Patent No.: US 9,519,608 B2
(45) Date of Patent: Dec. 13, 2016

(54) PCI EXPRESS TO PCI EXPRESS BASED LOW LATENCY INTERCONNECT SCHEME FOR CLUSTERING SYSTEMS

(71) Applicant: Mammen Thomas, Hercules, CA (US)

(72) Inventor: Mammen Thomas, Hercules, CA (US)

( * ) Notice: Subject to any disclaimer, the term of this patent is extended or adjusted under 35 U.S.C. 154(b) by 42 days.

(21) Appl. No.: 14/588,937

(22) Filed: Jan. 3, 2015

(65) Prior Publication Data

US 2015/0127875 A1    May 7, 2015

Related U.S. Application Data

(63) Continuation of application No. 13/441,883, filed on Apr. 8, 2012, which is a continuation of application No. 11/242,463, filed on Oct. 4, 2005, now Pat. No. 8,189,603.

(51) Int. Cl.
| | | |
|---|---|---|
| *H04N 13/04* | (2006.01) | |
| *G06F 13/40* | (2006.01) | |
| *H04L 12/931* | (2013.01) | |
| *G06F 13/42* | (2006.01) | |

(52) U.S. Cl.
CPC ....... *G06F 13/4022* (2013.01); *G06F 13/4221* (2013.01); *H04L 49/40* (2013.01)

(58) Field of Classification Search
IPC ..................................................... H04N 7/063
See application file for complete search history.

(56) References Cited

U.S. PATENT DOCUMENTS

| | | | |
|---|---|---|---|
| 7,480,303 B1 * | 1/2009 | Ngai | H04L 49/351 370/395.5 |
| 2003/0099247 A1 | 5/2003 | Toutant et al. | |
| 2003/0123461 A1 | 7/2003 | Riley | |
| 2003/0158940 A1 | 8/2003 | Leigh | |
| 2003/0188079 A1 | 10/2003 | Singhal et al. | |
| 2004/0062238 A1 * | 4/2004 | Yoshizawa | H04L 12/5695 370/360 |
| 2004/0083323 A1 | 4/2004 | Rabinovitz et al. | |
| 2004/0083325 A1 | 4/2004 | Rabinovitz et al. | |
| 2005/0147117 A1 * | 7/2005 | Pettey | H04L 49/356 370/463 |
| 2005/0147119 A1 | 7/2005 | Tofano | |
| 2006/0015537 A1 | 1/2006 | Mark | |
| 2006/0050693 A1 | 3/2006 | Bury et al. | |
| 2006/0101179 A1 | 5/2006 | Lee et al. | |
| 2006/0101185 A1 | 5/2006 | Kapoor et al. | |
| 2006/0114918 A1 * | 6/2006 | Ikeda | H04L 45/02 370/408 |

* cited by examiner

*Primary Examiner* — Tracy Li

(57) ABSTRACT

PCI Express is a Bus or I/O interconnect standard for use inside the computer or embedded system enabling faster data transfers to and from peripheral devices. The standard is still evolving but has achieved a degree of stability such that other applications can be implemented using PCIE as basis. A PCIE based interconnect scheme to enable switching and inter-connection between multiple PCIE enabled systems each having its own PCIE root complex, such that the scalability of PCIE architecture can be applied to enable data transport between connected systems to form a cluster of systems, is proposed. These connected systems can be any computing, control, storage or embedded system. The scalability of the interconnect will allow the cluster to grow the bandwidth between the systems as they become necessary without changing to a different connection architecture.

14 Claims, 2 Drawing Sheets

A Cluster enlargement using switch to switch interconnect

PCI EXPRESS TO PCI EXPRESS BASED LOW LATENCY INTERCONNECT SCHEME FOR CLUSTERING SYSTEMS

CROSS REFERENCE TO RELATED APPLICATIONS

This application is a continuation of U.S. patent application Ser. No. 13/411,883 titled "PCI Express to PCI Express based low latency interconnect scheme for clustering systems" filed on Apr. 8, 2012, which is a continuation of U.S. patent application Ser. No. 11/242,463 titled "PCI Express to PCI Express based low latency interconnect scheme for clustering systems" filed on Oct. 4, 2005 which issued as U.S. Pat. No. 8,189,603 on May 29, 2012, all of which have a common inventor, and are hereby incorporated by reference for all that they contain.

TECHNICAL FIELD

The invention generally relates to providing high speed interconnect between systems within an interconnected cluster of systems.

BACKGROUND AND PRIOR ART

The need for high speed and low latency cluster interconnect scheme for data and information transport between systems have been recognized as a limiting factor to achieving high speed operation in clustered systems and one needing immediate attention to resolve. The growth of interconnected and distributed processing schemes have made it essential that high speed interconnect schemes be defined and established to provide the speeds necessary to take advantage of the high speeds being achieved by data processing systems and enable faster data sharing between interconnected systems.

There are today interconnect schemes that allow data transfer at high speeds, the most common and fast interconnect scheme existing today is the Ethernet connection allowing transport speeds from 10 MB to as high as 10 GB/sec. TCP/IP protocols used with Ethernet have high over-head with inherent latency that make it unsuitable for some distributed applications. Further TCP/IP protocol tends to drop data packets under high traffic congestion times, which require resend of the lost packets which cause delays in data transfer and is not acceptable for high reliability system operation. Recent developments in optical transport also provide high speed interconnect capability. Efforts are under way in different areas of data transport to reduce the latency of the interconnect as this is a limitation on growth of the distributed computing, control and storage systems. All these require either changes in transmission protocols, re-encapsulation of data or modulation of data into alternate forms with associated delays increase in latencies and associated costs.

DESCRIPTION

What is Proposed

PCI Express (PCIE) has achieved a prominent place as the I/O interconnect standard for use inside computers, processing system and embedded systems that allow serial high speed data transfer to and from peripheral devices. The typical PCIE provides 2.5-3.8 GB transfer rate per link (this may change as the standard and data rates change). The PCIE standard is evolving fast, becoming faster and starting become firm and used within more and more systems. Typically each PCIE based system has a root complex which controls all connections and data transfers to and from connected peripheral devices through PCIE peripheral end points or peripheral modules. What is disclosed is the use of PCIE standard based peripherals enabled for interconnection to similar PCIE standard based peripheral connected directly using data links, as an interconnect between multiple systems, typically through one or more network switches. This interconnect scheme by using PCIE based protocols for data transfer over direct physical connection links between the PCIE based peripheral devices, (see FIG. 1), without any intermediate conversion of the transmitted data stream to other data transmission protocols or encapsulation of the transmitted data stream within other data transmission protocols, thereby reducing the latencies of communication between the connected PCI based systems within the cluster. The PCIE standard based peripheral enabled for interconnection at a peripheral end point of the system, by directly connecting using PCIE standard based peripheral to PCIE standard based peripheral direct data link connections to the switch, provides for increase in the number of links per connection as bandwidth needs of system interconnections increase and thereby allow scaling of the band width available within any single interconnect or the system of interconnects as required.

Some Advantages of the Proposed Connection Scheme:

1. Reduced Latency of Data transfer as conversion from PCIE to other protocols like Ethernet are avoided during transfer.

2. The number of links per connection can scale from X1 to larger numbers X32 or even X64 as PCIE capabilities increase to cater to the connection bandwidth needed. Minimum change in interconnect architecture is needed with increased bandwidth, enabling easy scaling with need.

3. Any speed increase in the link connection due to technology advance is directly applicable to the interconnection scheme.

4. Standardization of the PCIE based peripheral will make components easily available from multiple vendors, making the implementation of interconnect scheme easier and cheaper.

5. The PCIE based peripheral to PCIE based peripheral links in connections allow ease of software control and provide reliable bandwidth.

EXPLANATION OF NUMBERING AND LETTERING IN FIG. 1

(1) to (8): Number of Systems interconnected in FIG. 1 (9): Switch sub-system. (10): Software configuration and control input for the switch. (1a) to (8a): PCI Express based peripheral module (PCIE Modules) attached to systems. (1b) to (8b): PCI Express based peripheral modules (PCIE Modules) at switch. (1L) to (8L): PCIE based peripheral module to PCIE based peripheral module connections having n-links (n-data links)

EXPLANATION OF NUMBERING AND LETTERING IN FIG. 2

(12-1) and (12-2): clusters (9-1) and (9-2): interconnect modules or switch sub-systems. (10-1) and (10-2): Software configuration inputs (11-1) and (11-2): Switch to switch interconnect module in the cluster (11L): Switch to switch interconnection

DESCRIPTION OF INVENTION

PCI Express is a Bus or I/O interconnect standard for use inside the computer or embedded system enabling faster data transfers to and from peripheral devices. The standard is still evolving but has achieved a degree of stability such that other applications can be implemented using PCIE as basis. A PCIE based interconnect scheme to enable switching and inter-connection between multiple PCIE enabled systems each having its own PCIE root complex, such that the scalability of PCIE architecture can be applied to enable data transport between connected systems to form a cluster of systems, is proposed. These connected systems can be any computing, control, storage or embedded system. The scalability of the interconnect will allow the cluster to grow the bandwidth between the systems as they become necessary without changing to a different connection architecture.

Figure 1:
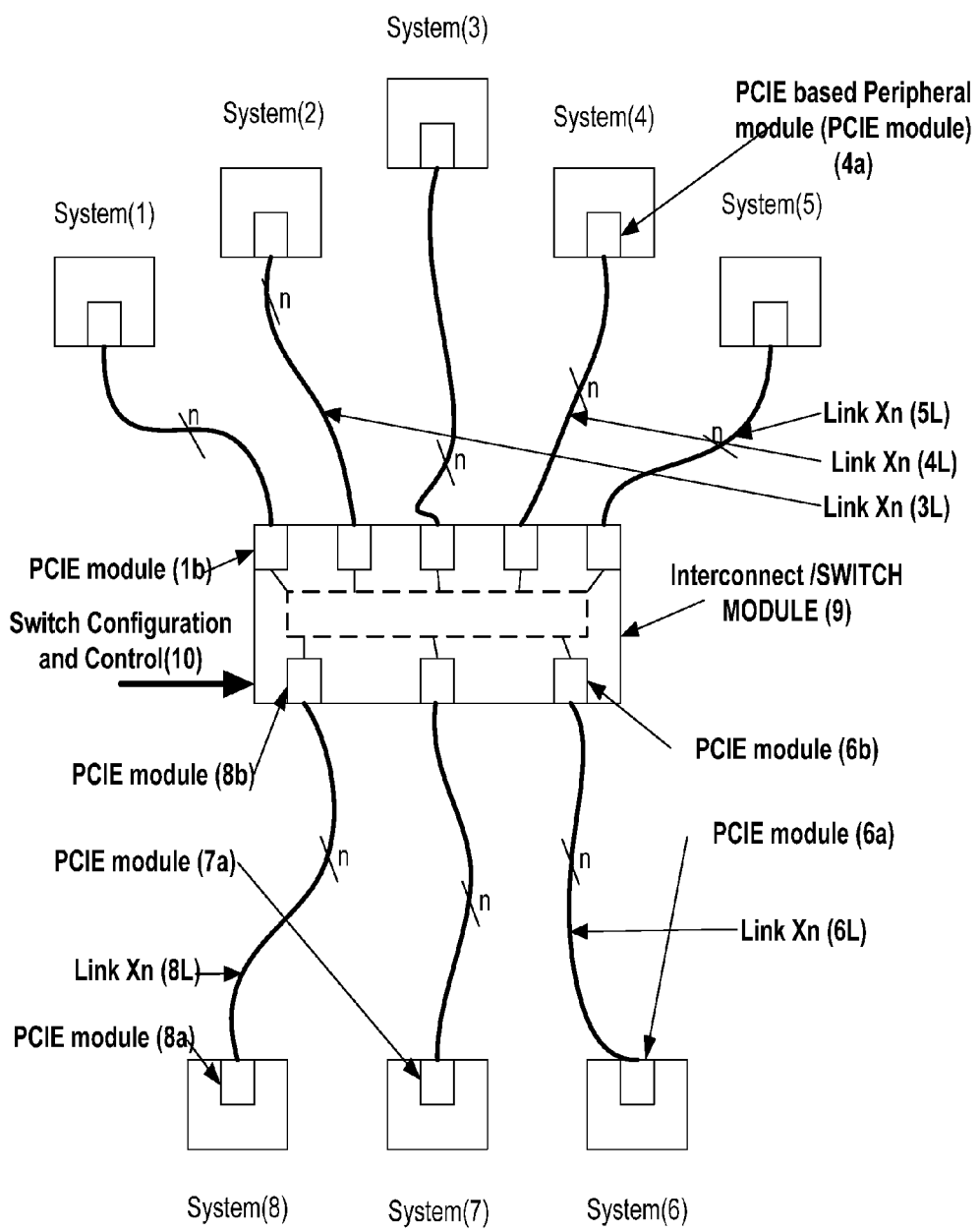
FIG. 1 Typical Interconnected (multi-system) cluster (shown with eight systems connected in a star architecture using direct connected data links between PCIE standard based peripheral to PCIE standard based peripheral)

FIG. 1 is a typical cluster interconnect. The Multi-system cluster shown consist of eight units or systems {(1) to (8)} that are to be interconnected. Each system is PCI Express (PCIE) based system with a PCIE root complex for control of data transfer to and from connected peripheral devices via PCIE peripheral modules as is standard for PCIE based systems. Each system to be interconnected has at least a PCIE based peripheral module {(1a) to (8a)} as an IO module, at the interconnect port enabled for system interconnection, with n-links built into or attached to the system. (9) is an interconnect module or a switch sub-system, which has number of PCIE based connection modules equal to or more than the number of systems to be interconnected, in this case of FIG. 1 this number being eight {(1b) to (8b)}, that can be interconnected for data transfer through the switch. A software based control input is provided to configure and/or control the operation of the switch and enable connections between the switch ports for transfer of data. Link connections {(1L) to (8L)} attach the PCIE based peripheral modules 1a to 8a, enabled for interconnection on the respective systems 1 to 8, to the on the switch with n links. The value of n can vary depending on the connect band width required by the system.

When data has to be transferred between say system 1 and system 5, in the simple case, the control is used to establish an internal link between PCIE based peripheral modules 1b and 5b at the respective ports of the switch. A hand shake is established between outbound communication enabled PCIE based peripheral module (PCIE Module) 1a and inbound PCIE module 1b at the switch port and outbound PCIE module 5a on the switch port and inbound communication enabled PCIE module 5b. This provides a through connection between the PCIE modules 1a to 5b through the switch allowing data transfer. Data can then be transferred at speed between the modules and hence between systems. In more complex cases data can also be transferred and qued in storage implemented in the switch, at the ports and then when links are free transferred out to the right systems at speed.

Multiple systems can be interconnected at one time to form a multi-system that allow data and information transfer and sharing through the switch. It is also possible to connect smaller clusters together to take advantage of the growth in system volume by using an available connection scheme that interconnects the switches that form a node of the cluster.

If need for higher bandwidth and low latency data transfers between systems increase, the connections can grow by increasing the number of links connecting the PCIE modules between the systems in the cluster and the switch without completely changing the architecture of the interconnect. This scalability is of great importance in retaining flexibility for growth and scaling of the cluster.

It should be understood that the system may consist of peripheral devices, storage devices and processors and any other communication devices. The interconnect is agnostic to the type of device as long as they have a PCIE module at the port to enable the connection to the switch. This feature will reduce the cost of expanding the system by changing the switch interconnect density alone for growth of the multi-system.

PCIE is currently being standardized and that will enable the use of the existing PCIE modules to be used from different vendors to reduce the over all cost of the system. In addition using a standardized module in the system as well as the switch will allow the cost of software development to be reduced and in the long run use available software to configure and run the systems.

As the expansion of the cluster in terms of number of systems, connected, bandwidth usage and control will all be cost effective, it is expected the over all system cost can be reduced and over all performance improved by standardized PCIE module use with standardized software control.

Typical connect operation may be explained with reference to two of the systems, example system (1) and system (5). System (1) has a PCIE module (1a) at the interconnect port and that is connected by the connection link or data-link or link (1L) to a PCIE module (1b) at the IO port of the switch (9). System (5) is similarly connected to the switch trough the PCIE module (5a) at its interconnect port to the PCIE module (5b) at the switch (9) IO port by link (5L). Each PCIE module operates for transfer of data to and from it by standard PCI Express protocols, provided by the configuration software loaded into the PCIE modules and switch. The switch operates by the software control and configuration loaded in through the software configuration input.

Figure 2:
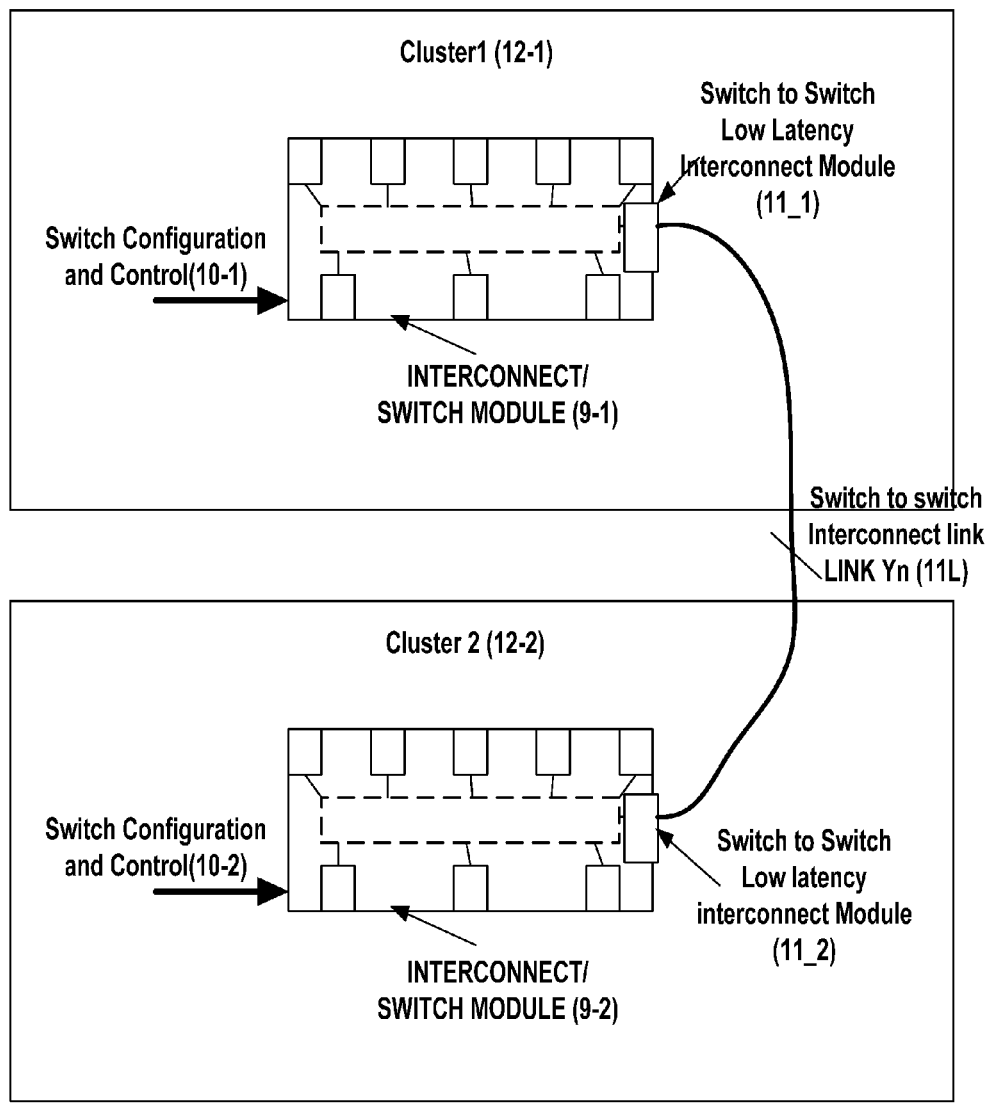
FIG. 2 A cluster using multiple interconnect modules or switches to interconnect smaller clusters.

FIG. 2 is that of a multi-switch cluster. As the need tom interconnect larger number of systems increase, it will be optimum to interconnect multiple switches of the clusters to form a new larger cluster. Such a connection is shown in FIG. 2. The shown connection is for two smaller clusters (12-1 and 12-2) interconnected using PCIE modules that can be connected together using any low latency switch to switch connection (11-10 and 11-2), connected using interconnect links (11L) to provide sufficient band width for the connection. The switch to switch connection transmits and receives data and information using any suitable protocol and the switches provide the interconnection internally through the software configuration loaded into them.

The following are some of the advantages of the disclosed interconnect scheme 1. Provide a low latency interconnect for the cluster. 2. Use of PCI Express based protocols for data and information transfer within the cluster. 3. Ease of growth in bandwidth as the system requirements increase by increasing the number of links within the cluster. 4. Standardized PCIE component use in the cluster reduce initial cost. 5. Lower cost of growth due to standardization of hardware and software. 6. Path of expansion from a small cluster to larger clusters as need grows. 7. Future proofed system architecture. 8. Any speed increase in the link connection due to technology advance is directly applicable to the interconnection scheme.

In fact the disclosed interconnect scheme provides advantages for low latency multi-system cluster growth that are not available from any other source.

While the invention has been described in terms of several embodiments, those of ordinary skill in the art will recognize that the invention is not limited to the embodiments described, but can be practiced with modification and alteration within the spirit and scope of the appended claims. Multiple existing methods and methods developed using newly developed technology may be used to establish the hand shake between systems and to improve data transfer and latency. The description is thus to be regarded as illustrative instead of limiting and capable of using any new technology developments in the field of communication an data transfer. There are numerous other variations to different aspects of the invention described above, which in the interest of conciseness have not been provided in detail. Accordingly, other embodiments are limited only within the scope of the claims.

The invention claimed is:

1. An architecture for interconnecting multiple PCI Express (PCIE) based processing systems each having a PCI root complex and at least a PCIE peripheral unit as an end point enabled for system interconnection (PCIE_I) and transferring data, a network switch having multiple ports enabled for using PCIE links and using PCIE protocol for interconnection, wherein each of the plurality of the PCIE based processing systems are coupled through its at least one PCIE_I enabled for system interconnection to one of the multiple port of the network switch, providing a one to one connection between the at least a PCIE_I enabled for system interconnection and the network port, making an interconnected cluster of PCIE based processing systems, the network switch being configured to enable transfer of data between any of a first connected PCIE_I of the multiple PCIE based processing systems to any other of the connected PCIE_I of the multiple PCIE based processing systems without intermediate conversion of the transmitted data stream to other data transmission protocols or encapsulation of the transmitted data stream within other data transmission protocols.

2. The architecture of claim 1, wherein a configuration of the network switch enable connection between the ports of the network switch to enable data transfer between the ports of the switch.

3. The architecture of claim 1, wherein the data is transferred between the first connected PCIE-I and any of the rest of the connected PCIE_I through the network switch.

4. The architecture of claim 1, wherein the network switch is enabled to connect to a multiple of similarly configured network switches for data and control transfer between the multiplicity of connected and configured switches and hence between the clusters, by linking the ports on the switches, using PCIE links and using PCIE protocols, thereby expanding the cluster size of interconnected PCIE based processing systems.

5. The architecture of claim 3, wherein the multiple clusters are interconnected through a multiplicity of switches to enable large multiprocessor systems with full capability for data and control sharing as well as peripheral device sharing across the systems using PCIE interconnect and PCIE protocols.

6. The architecture of claim 3, wherein one or more switches are used only for interconnecting the clusters.

7. A system comprising: a plurality of PCI Express (PCIE) enabled systems each having its own PCIE root complex and at least a PCIE peripheral module as an end point enabled for system interconnection (PCIE-I); a PCIE switch having a multiplicity of ports, coupled to the PCIE-I enabled for system interconnection of each PCIE enabled system using PCIE links, wherein the PCIE-I enabled for system interconnection enables access through the PCIE switch by a first PCIE enabled system to any or all of the other connected PCIE enabled systems and peripheral devices connected thereto without intermediate conversion of the transmitted data stream to other data transmission protocols or encapsulation of the transmitted data stream within other data transmission protocols.

8. The system of claim 7, wherein the PCIE switch is configured to couple to and transfer data and control information from any one of the ports to any of the other ports of the PCIE switch.

9. The system of claim 7, wherein the PCIE-I enabled for system interconnection is configured for transfer of data and control information from one PCIE enabled system coupled to the PCIE switch to any of the other PCIE enabled system coupled to the PCIE switch, through the PCIE switch using PCIE protocol.

10. The system of claim 7, wherein the coupling of the plurality of PCIE enabled system to the PCIE switch enable formation of a cluster of interconnected PCIE enabled systems enabling use of data and controls for multiprocessor computations.

11. The system of claim 7, wherein the coupling of the plurality of PCIE enabled systems to the PCIE switch enable the connected systems to form a connected cluster allowing sharing of peripheral devices connected to any of the connected PCIE enabled systems in the cluster.

12. A method comprising: transferring of data and control information from a first PCI Express (PCIE) enabled processing system having a PCIE root complex and at least a PCIE peripheral module as an end point enabled for system interconnect (PCIE-I) through a PCIE switch coupled to the PCIE enabled processing system at the PCIE-I using at least a PCIE link, to a second plurality of PCIE enabled processing systems, that are coupled to the PCIE switch through a PCIE-I enabled for system interconnection of each of the second plurality of PCIE enabled processing systems using PCIE links and without intermediate conversion of the transmitted data stream to other data transmission protocols or encapsulation of the transmitted data stream within other data transmission protocols;

where in the first PCIE enabled processing system and the second plurality of PCIE enabled processing systems coupled through the PCIE switch form an interconnected cluster of PCIE enabled processing units interconnected by the PCIE switch;

configuring the PCIE-I enabled for system interconnection of the PCIE enabled processing systems of the cluster to enable transfer of data and control information; and configuring the PCIE switch to enable interconnection through the PCIE switch from the PCIE-I enabled for system interconnection of the first PCIE enabled processing system coupled to the PCIE switch, to the PCIE-I enabled for system interconnection of any of the second plurality of PCIE enabled processing units coupled to the PCIE switch using PCIE protocol.

13. The method of claim 12, wherein the PCIE-I enabled for system interconnection of the PCIE enabled processing systems of the cluster are enabled for transfer of data and control information using PCIE protocol.

14. The method of claim 12, wherein interconnecting a plurality of clusters by interconnecting a plurality of associated PCIE switches enable growing the cluster size of interconnected PCIE enabled processing systems.

\* \* \* \* \*